United States Patent
Zheng

(10) Patent No.: US 11,797,643 B2
(45) Date of Patent: Oct. 24, 2023

(54) APPARATUS AND METHOD FOR MATRIX MULTIPLICATION USING PROCESSING-IN-MEMORY

(71) Applicant: NeoNexus Pte. Ltd., Singapore (SG)

(72) Inventor: Qilin Zheng, Beijing (CN)

(73) Assignee: NEONEXUS PTE. LTD., Singapore (SG)

( * ) Notice: Subject to any disclaimer, the term of this patent is extended or adjusted under 35 U.S.C. 154(b) by 610 days.

(21) Appl. No.: 17/093,538

(22) Filed: Nov. 9, 2020

(65) Prior Publication Data

US 2022/0129519 A1    Apr. 28, 2022

Related U.S. Application Data

(63) Continuation of application No. PCT/CN2020/123867, filed on Oct. 27, 2020.

(51) Int. Cl.
*G06F 17/16* (2006.01)
*G06F 7/06* (2006.01)

(52) U.S. Cl.
CPC .................................. *G06F 7/06* (2013.01)

(58) Field of Classification Search
CPC ........ G06F 17/16; G06N 3/045; G06N 3/065; Y02D 10/00
USPC ........................................................ 708/520
See application file for complete search history.

(56) References Cited

U.S. PATENT DOCUMENTS

2022/0391206 A1*  12/2022  Boswell ................ G06F 9/3012

* cited by examiner

*Primary Examiner* — Tan V Mai
(74) *Attorney, Agent, or Firm* — Bayes PLLC

(57) ABSTRACT

Embodiments of apparatus and method for matrix multiplication using processing-in-memory (PIM) are disclosed. In an example, an apparatus for matrix multiplication includes an array of tiles that each include one or more PIM blocks. A PIM block may include a hybrid-mode PIM block that may be configured into a digital mode or an analog mode. The PIM block configured into digital mode may perform operations associated with depth-wise (DW) convolution. On the other hand, a PIM block configured into analog mode may perform operations associated with point-wise (PW) convolution. A controller may be used to configure the PIM block into either digital mode or analog mode, depending on the computations.

20 Claims, 8 Drawing Sheets

APPARATUS AND METHOD FOR MATRIX MULTIPLICATION USING PROCESSING-IN-MEMORY

CROSS REFERENCE TO RELATED APPLICATION

This application is continuation of International Application No. PCT/CN2020/123867, filed on Oct. 27, 2020, entitled "APPARATUS AND METHOD FOR MATRIX MULTIPLICATION USING PROCESSING-IN-MEMORY," which is hereby incorporated by reference in its entirety.

BACKGROUND

Embodiments of the present disclosure relate to processing-in-memory (PIM).

Ultra-low power machine learning processors are essential to performing cognitive tasks for embedded systems as the power budget is limited, e.g., with batteries or energy harvesting sources. However, the data generated by deep convolution neural network (DCNN) incurs heavy traffic between memory and computing units in conventional von Neumann architectures, and adversely affects the energy efficiency of these systems. Resistive random-access memory (ReRAM) based non-volatile PIM (NVPIM) emerges as a promising solution of accelerating DCNN executions. The high cell density of ReRAM allows large on-chip ReRAM arrays to be implemented on the chip to store the parameters of the DCNN while proper functions, e.g., vector-matrix multiplications (VMM), can be directly performed in the ReRAM arrays and their peripheral circuits.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Embodiments of apparatus and method for matrix multiplication using PIM are disclosed herein.

In one example, the apparatus may comprise a hybrid-mode PIM device that may be configured into digital mode or analog mode. The hybrid-mode PIM device may comprise an input component configured to store a first vector and input data, a memory array, a peripheral logic configured to operate in analog mode and digital mode, and a control circuit configured to enable peripheral logic to perform a multiplication operation or accumulation operation, in digital mode, and to enable the peripheral logic to perform a shift-add operation and generate a partial sum, in analog mode.

In another example, the PIM block may be configured to identify a set of memory units (MUs) based at least in part on a resolution associated with an analog-to-digital converter (ADC). In certain aspects, the set of MUs may be located in a channel of a memory array, the channel including a set of columns of the memory array. In certain other aspects, each memory unit (MU) in the set of MUs being comprised of a set of adjacent memory cells located in a column of the set of columns. The PIM device may map each element in each matrix in a set of matrices to at least one MU in the set of MUs based at least in part on a precision of weights associated with the first matrix. The PIM device may map the weights associated with each matrix in the set of matrices to the set of MUs as a vector. The PIM device may map each matrix in the set of matrices to a different column in the channel.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
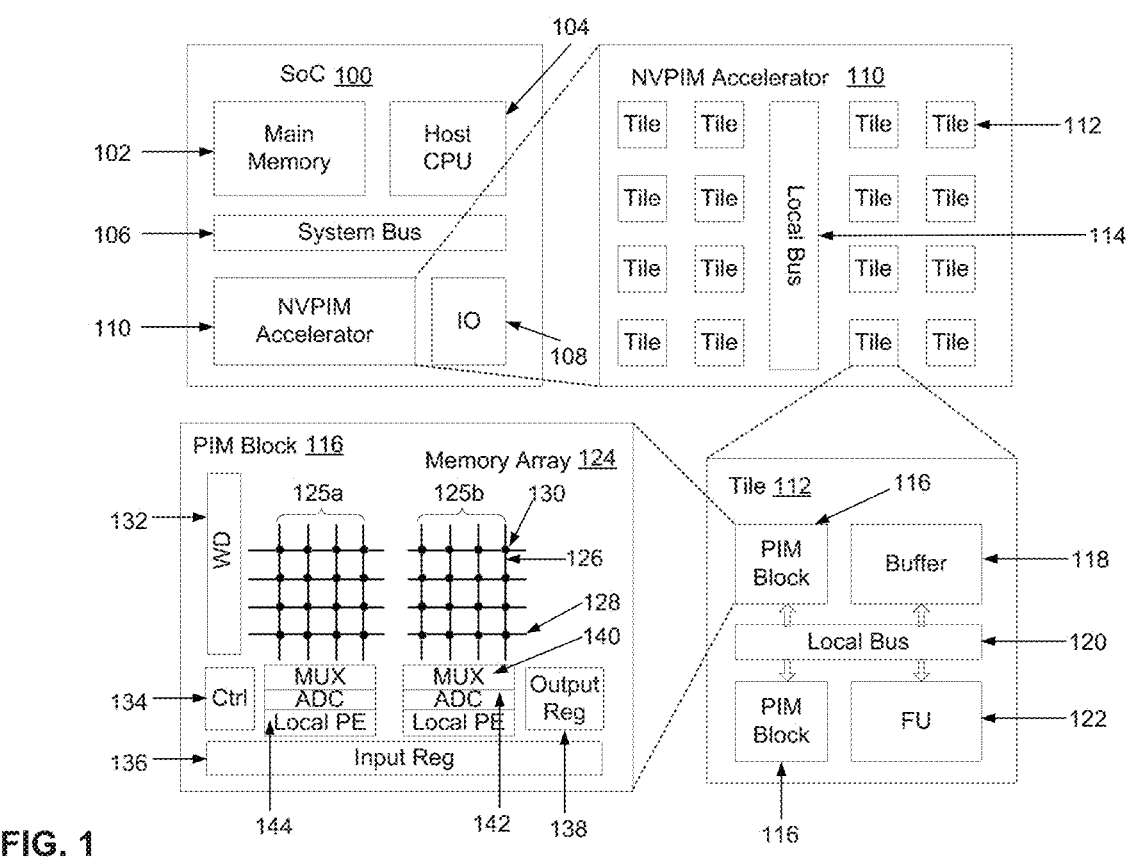
FIG. 1 illustrates a block diagram of a system-on-chip (SoC) device in accordance with certain aspects of the disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context.

Deep Convolutional Neural Networks (DCNNs) have been successfully applied to various fields, such as image classification. The success of DCNNs, however, comes at the cost of high computation intensity, undesirable computation time, and the use of a large dataset. Thus, using presently available DCNN techniques in resource constraint systems (e.g., such as mobile devices, edge computing nodes, smart embedded device, etc.) may be challenging or even impractical. To overcome the computational and time constraints, hardware accelerators dedicated to DCNNs have been developed. One such hardware accelerator that has been developed includes a Non-volatile Processing-In-Memory (NVPIM) architecture, which may reduce the time and computational resources used to perform DNCC computations. For example, NVPIM may perform Vector-Matrix-Multiplication (VMM) operations via analog computing in the memory array (e.g., memory crossbar) itself, which may reduce computational time. In addition, NVPIM may reduce the overhead of data movement because the computation happens in-situ inside the memory array. Lightweight DNCC models have also been developed to reduce computation intensity and the number of model parameters. Depthwise DCNN is one such lightweight model. In Depth-wise DCNN, the conventional convolution layer is replaced with a combination of the Depth-wise (DW) convolution layer and the Point-Wise (PC) convolution layer, which use fewer multiplication and accumulation operations, as compared to other DNCC models.

Although using an NVPIM architecture and DW convolution may improve the inference efficiency of DNCC operations, the overall efficiency degrades when mapping a DW DCNN to existing NVPIM architecture. Existing NVPIM architectures are mainly designed for standard convolution, where the PW convolution layer in DW DCNN may be efficiently processed. Here, the PW convolution layer may be regarded as a standard convolution with 1×1 kernels. However, due to the low utilization of the memory array (e.g., memory crossbar) when mapping a DW convolution layer to NVPIM architecture as a VMM data layout, the DW convolution may not be executed efficiently enough for use in resource-constrained systems. One issue is that the feature map is only used for computation in its own channel, which may lead to a large number of unused memory cells in the memory array.

In order to enable efficient inference for both DW and PW convolution layers, various embodiments in accordance with the present disclosure provide a hybrid digital/analog mode NVPIM architecture. For example, the present disclosure provides a digital mode NVPIM architecture that may process DW convolution layers more efficiently than conventional techniques, while using an analog mode for computation of PW convolution layers. Additional details of the hybrid digital/analog mode NVPIM architecture are set forth below, e.g., in connection with FIGS. 1-6.

By way of example and not limitation, the present disclosure describes ReRAM as an example to illustrate the design of hybrid mode NVPIM architecture. However, it would be understood by one of ordinary skill that the techniques described below in connection with FIGS. 1-6 may be extended to any non-volatile memory (NVM) technology without departing from the scope of the present disclosure. For example, the techniques described herein may also be applied to spin-transfer torque magnetic random-access memory (STT-MRAM), ferroelectric field-effect transistor (FeFET) memory, just to name a few.

FIG. 1 illustrates a block diagram of an embedded system-on-chip (SoC) apparatus 100 in accordance with certain aspects of the disclosure. The SoC apparatus 100 may include, e.g., a main memory 102, a host computer processing unit (CPU) 104, a system bus 106, an input-output (IO) processor 108, and an NVPIM accelerator 110, among other things. The NVPIM accelerator 110 may include a plurality of tiles 112 connected by a local bus 114. Each tile 112 may include one or more processing-in-memory (PIM) blocks 116 configured to perform VMM computations, an in-tile buffer 118 configured to store intermediate data, and a functional unit (FU) 120 configured to process computations other than VMM computations.

Each PIM block 116 may include a memory array 124 comprised of one or more memory crossbars 125a, 125b. Each memory crossbar 125a, 125b may include a plurality of wordlines 128, a plurality of bitlines 126, and a memory cell 130 (e.g., ReRAM memory cell, STT-MRAM memory cell, FeFET memory cell, etc.) located at each intersection of a wordline 128 and a bitline 126. Each PIM block 116 may also include an input register 136 (e.g., input component) configured to buffer input data, an output register 138 (e.g., output component) configured to buffer output data, and a peripheral circuit such as a controller 134 configured to control and/or initiate operations performed at the PIM block 116. Additional peripheral circuits may also be included, e.g., such multiplexer (MUX) 140, an analog-to-digital converter (ADC), as local peripheral element (PE) 144.

In certain implementations, the controller 134 may configure the PIM block 116 to operate in hybrid mode when performing operations associated with DW convolution and to operate in analog mode when performing operations associated with PW convolution. In other words, a PIM block 116 may be able to switch between hybrid mode and analog mode, depending on whether performing operations associated with DC convolution or PW convolution. In analog mode, the local PE 144 may be configured to perform at least a portion of the operations associated with PW convolution, e.g., as described below in connection with FIG. 5A. In digital mode, peripheral logic, e.g., such as local peripheral element (PE) 144 may be used to perform at least a portion of the operations associated with DW convolution, e.g., as described below in connection with FIG. 5B.

Logic values may be stored as the resistance of memory cells 130, which may be switched between two or more levels by applying electrical excitation with different amplitudes and duration. The memory cells 130 may be arranged with the structure of a memory crossbar 125a, 125b, which may be used to perform VMM. The elements of a matrix (e.g., kernels) may be represented as the conductance of the memory cell 130. The vector may be represented by the voltages applied at the inputs of the memory crossbar 125a, 125b. The voltages may be generated by wordline driver 132. The voltages may be either binary or multi-level depending on the implementation. When the voltage is applied to the wordlines 128, currents may accumulate at the bitlines 126. The bitline currents may be collected at the MUX 140, which may be the outputs of the memory crossbar 125a, 125b. The collected bitline currents may represent the VMM, for example. In the example architecture depicted in FIG. 1, at least one ADC 142 may be used to convert the signal of the analog bitline current to digital values.

In certain implementations, the wordline driver 132 may be configured to activate all wordlines 128 in a memory crossbar 125a, 126c, and the number of ADCs 142 may be equal to the number of columns (e.g., bitlines 126) in the memory crossbar 125a, 125b. In this implementation, a time complexity of O(1) would be used to perform the VMM computation. However, concurrently activating all of the wordlines 128 may reduce the accuracy of the computation. For example, a high bitline 126 current may induce an IR-drop. In addition, memory cell 130 resistance variations may induce an accumulated error. In order to reduce the inaccuracy in the VMM computation, the wordline driver 132 may concurrently activate a subset of the wordlines 128. Furthermore, because the ADC 142 may consume more power and substrate area than a memory crossbar 125a, 126b, one ADC 142 may be shared by multiple bitlines 126 and only a limited number of bitline currents may be sampled in a single ADC cycle.

Figure 2:
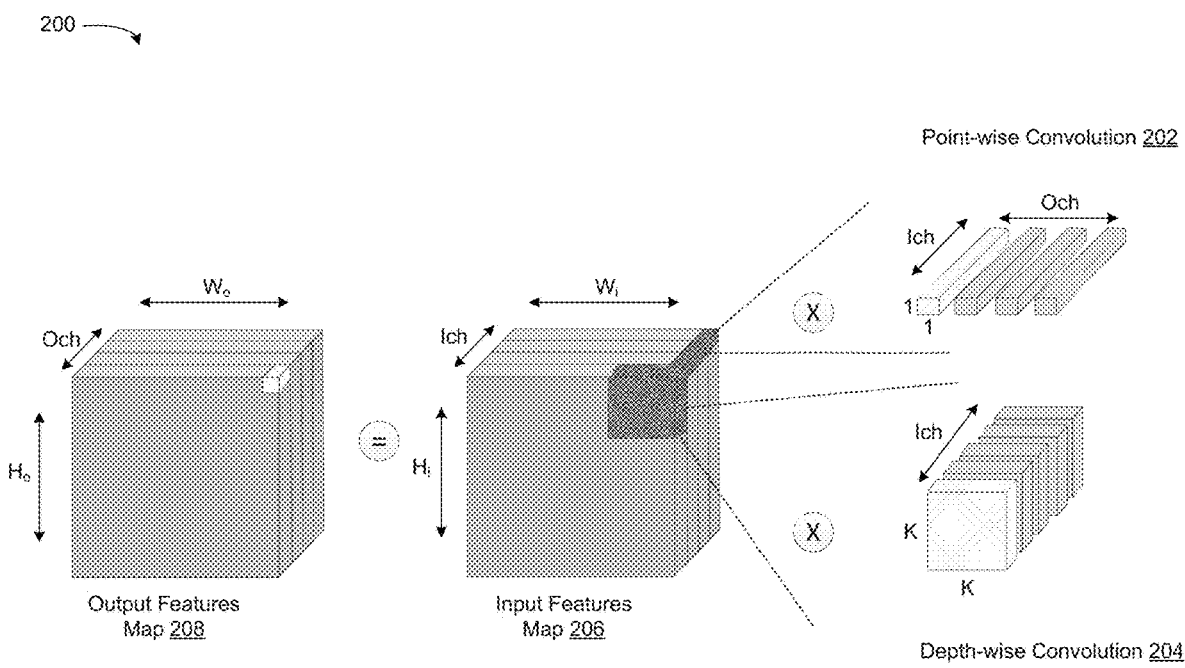
FIG. 2 illustrates two exemplary computation flows that may be performed by a PIM block in accordance with some embodiments of the present disclosure

FIG. 2 illustrates exemplary computation flows 200 that may be performed by a PIM block in accordance with some embodiments of the present disclosure. The exemplary computation flows 200 may be performed by any one or combination of, e.g., PIM block 116, memory array 124, memory crossbar 125a, memory crossbar 125b, bitline 126, wordline 128, memory cell 130, wordline driver (WD) 132, controller 134, input register 136, output register 138, MUX 140, ADC 142, local PE 144, "AND" logic 502, MUX circuit 504, shift-adder 506.

In depth-wise DCNN, a standard convolution may be factorized into a DW convolution and a 1×1 convolution, which is also referred to as a PW convolution 202. DW convolution 204 may apply a filter to each input channel 206 for spatial accumulation. PW convolution 202, on the other hand, may apply a 1×1 standard convolution to perform inter-channel feature maps accumulation.

In the exemplary computation flow 200 of FIG. 2, an NN layer takes a tensor $T^{in}$ in the dimension of [Ich×$H_i$×$W_i$] as input and produces tensor $T^{out}$ in the dimension of [Ich× $H_o$×$W_o$] as an output features map 208. Here, $H_i/H_o$, $W_i/W_o$, Ich, Och represent the spatial height, width, input, and output depth, respectively. In DW convolution 204, the kernel tensor $T^k$ is the dimension of [Ch×K×K], where K represents the kernel size. For example, the convolution of the depth-wise layer may be described using Equation (2):

$$T_{ch}^{out}(h, w) = \sum_{s=0}^{K-1} \sum_{t=0}^{K-1} T_{ch}^{in}(h+s, w+t) \times T_{ch}^{k}(s, t) \quad (2)$$

Figure 3:
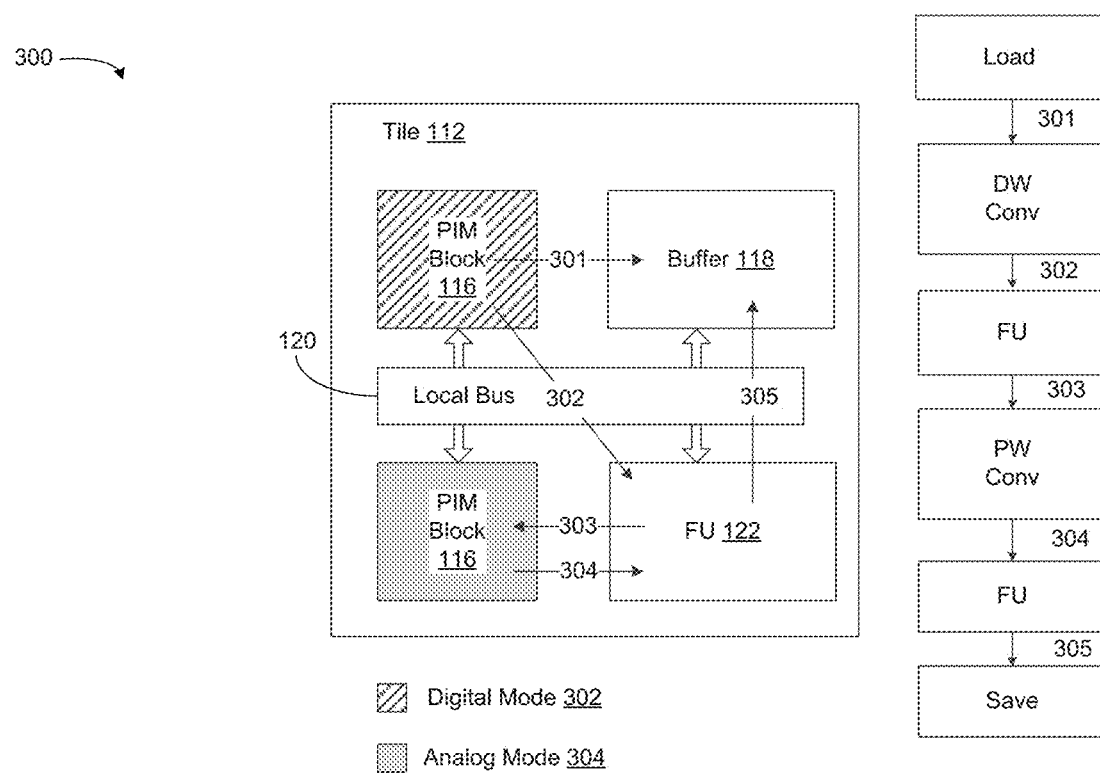
FIG. 3 illustrates an exemplary tile-level computation flow for a depth-wise convolution in accordance with some embodiments of the present disclosure.

FIG. 3 illustrates an exemplary tile-level computation flow 300 for a DW convolution in accordance with some embodiments of the present disclosure. The computation flow 300 in FIG. 3 may be performed by, e.g., tile 112 of the proposed NVPIM architecture described above in connection with FIG. 1. As depicted in FIG. 3, the tile 112 may include a PIM block 116 configured in hybrid mode 302 and a PIM block 116 configured in analog mode 304. When configured in hybrid mode 302, the PIM block 116 may be configured for DW convolution by performing multiplication and accumulation in memory peripheral circuits (e.g., local PE 144). When configured in analog mode 304, the PIM block 116 may be configured for PW convolution by performing VMM computation. The functional unit (FU) 122 may be configured to perform functions such as, e.g., pooling, activation, feature maps addition, etc.

Referring to the computation flow 300, feature maps may be loaded (at 301) into the PIM block 116 configured in hybrid mode 302. The PIM block 116 configured in hybrid mode 302 may perform DW convolution-based at least in part on the feature maps to generate first output data. The first output data may be sent (at 302) to the FU 122. The FU 122 may generate intermediate feature maps by performing activation or a pooling on the output data. The intermediate feature maps may be sent (at 303) to the PIM block 116 configured in analog mode 304. The PM block 116 configured in analog mode 304 may perform PW convolution on the intermediate feature maps to generate second output data. The second output data may be sent (at 304) to the FU 122. The FU 122 may perform activation or max pooling operations on the second output data to generate output feature maps 208, which are then sent (at 305) to the buffer 118 in this tile 112 or in an adjacent tile (not shown).

Figure 4A:
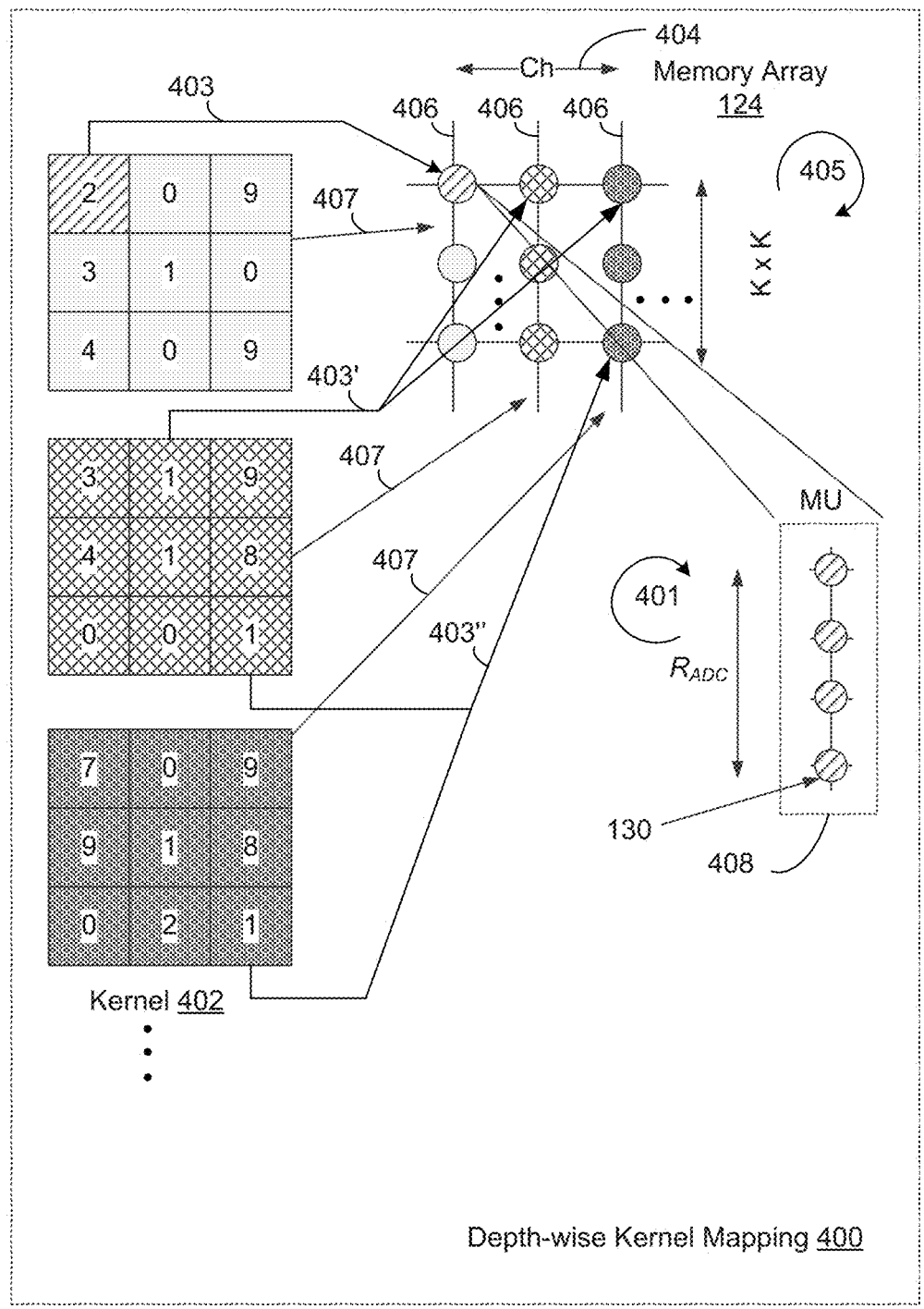
FIG. 4A illustrates an exemplary kernel mapping flow in accordance with certain aspects of the present disclosure.

FIG. 4A illustrates an exemplary DW kernel mapping flow 400 in accordance with certain aspects of the present disclosure. The DW kernel mapping flow 400 illustrated in FIG. 4A may be implemented by any one or combination of, e.g., PIM block 116, memory array 124, memory crossbar 125a, memory crossbar 125b, bitline 126, wordline 128, memory cell 130, WD 132, controller 134, input register 136, output register 138, MUX 140, ADC 142, local PE 144, "AND" logic 502, MUX circuit 504, shift-adder 506.

In the example illustrated in FIG. 4A, the weights of the DW convolution layer may be mapped into one memory crossbar 125a. The configuration of the kernels 402 may be represented by [Ch, K, K], where Ch is the number of channels 404 in the memory crossbar 125a, and K is the kernel size. In this particular example, each memory cell 130 stores a binary value, e.g., '0' or '1', for simplicity. However, each memory cell 130 may store multi-level information without departing from the scope of the present disclosure. Again, in the example illustrated in FIG. 4A, the resolution of the ADC 142 ($R_{ADC}$) is set to 4, but it is not limited thereto. More generally, the resolution of the ADC 142 ($R_{ADC}$) may comprise any value that is less than or equal to the maximum logic value (e.g., number of bits) that can be sampled to within an accuracy threshold during a single ADC cycle by the ADC 142. Hence, depending on the maximum logic value sampled to within the accuracy threshold, the $R_{ADC}$ may be less than or greater than 4 without departing from the scope of the present disclosure.

A set of memory units (MUs) 408 located in a same channel 404 may be identified (at 401) based at least in part on $R_{ADC}$. For example, a set of $R_{ADC}$ adjacent memory cells 130 located in a same column 406 (e.g., bitline 126) may be grouped into a MU 408. Again, the number of memory cells 130 are grouped such that the logic value (e.g., 4-bit) of a single MU 408 may be accurately sampled during a single ADC cycle by an ADC 142.

The kernels 402 used in the example illustrated in FIG. 4A each include a plurality of elements (e.g., nine in the example of FIG. 4A), and each of the elements includes a weight (e.g., integer value). The mapping of the elements to MU(s) may depend on the precision of the weights, as described below.

In certain implementations, the precision of the weights may be equal to $R_{ADC}$. Here, in each of the kernels 402, one element may be mapped (at 403) to a single MU 408. In certain other implementations, the precision of the weights may be greater than $R_{ADC}$. For example, the precision of the weights may be 8-bit, and $R_{ADC}$ may be 4-bit. Here, in each of the kernels, one element may be divided into 4-bit least significant bit (LSB) and 4-bit most significant bit (MSB) and mapped (at 403') to two MUs 408 located in adjacent columns 406. In certain other implementations, the precision of the weights may be less than $R_{ADC}$. For example, the precision of the weights may be 2-bit, and $R_{ADC}$ is 4-bit. Here, in each of the kernels, two elements in the same locations of two kernels are grouped and then mapped (at 403") one MU 408 in the memory array 124. Once the elements are mapped using one of the three example techniques described above, the DW kernel mapping flow 400 may proceed as follows.

The weights in each kernel 402 may be mapped (at 405) to K×K MUs 408 located in the same column 406 of the memory array 124, e.g., as a vector. Each of the kernels 402 may be mapped (at 407) into a single column 406 of the memory array 124. Thus, in the example illustrated in FIG. 4A, Ch columns are used.

Using the DW kernel mapping flow 400 described above may achieve a higher memory utilization than when using conventional DW kernel mapping techniques. It should be understood that the DW kernel mapping flow 400 is not limited to instances when the DW convolution layer fits into a single memory crossbar 125a of memory array 124. On the contrary, the DW kernel mapping flow 400 may be extended to the case where the DW convolution layer cannot fit into a single memory crossbar 125a of memory array 124. Here, the DW convolution layer uses K×K×Ch MUs 408 to map all its weights, which may be mapped into multiple memory crossbars 125a, 125b of memory array 124.

Figure 4B:
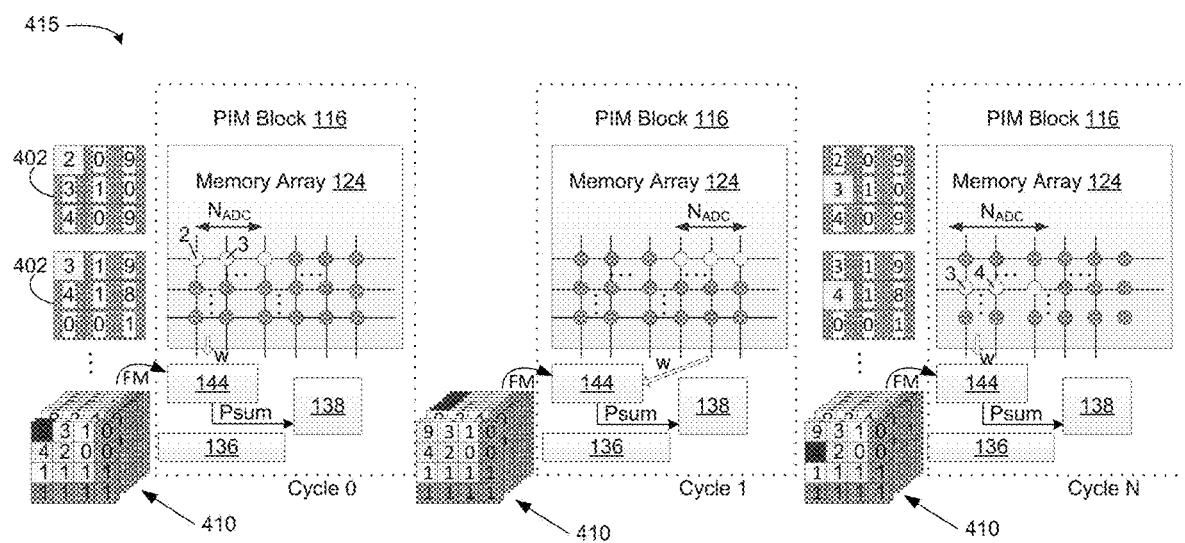
FIG. 4B illustrates an exemplary convolution flow that may be performed using the exemplary kernel mapping flow of FIG. 4A in accordance with certain embodiments of the disclosure.

FIG. 4B an exemplary DW convolution flow 415 that may be performed by a PIM block 116 configured in digital mode in accordance with certain embodiments of the disclosure. The DW convolution flow 415 illustrated in FIG. 4B may use, e.g., the DW kernel mapping flow 400 described above in connection with FIG. 4A.

Referring to FIG. 4B, weights (w) may be fetched from the memory array 124 and computed in the memory peripheral logics (e.g., local PE 144). The weights (w) may be mapped to the memory array 124. The input feature maps 410 may be maintained at the input register 136. The number of ADCs in each PIM block 116 may be defined as $N_{ADC}$. Thus, $N_{ADC}$ MUs (e.g., such as MU 408 in FIG. 4A) may be read out in each ADC cycle. The weights (w) may be sent to the local PE(s) 144. The corresponding feature maps 410 may be fetched to the local PE(s) 144. The local PE 144 may multiply the feature maps 410 with the weights (w). The output results, e.g., such as a partial sum (Psum), may be sent to the output register 138.

As shown in Cycle 0 and Cycle 1, the weights (w) may be read out using the row-major technique. In Cycle N, the second row of MUs may be read out and sent to the local PE 144 for multiplication. The Psum in the output register 138 may be fetched to the local PE 144 and added to the multiplication results. The local PE 144 may send the accumulated results to the output register 138.

Figure 5A:
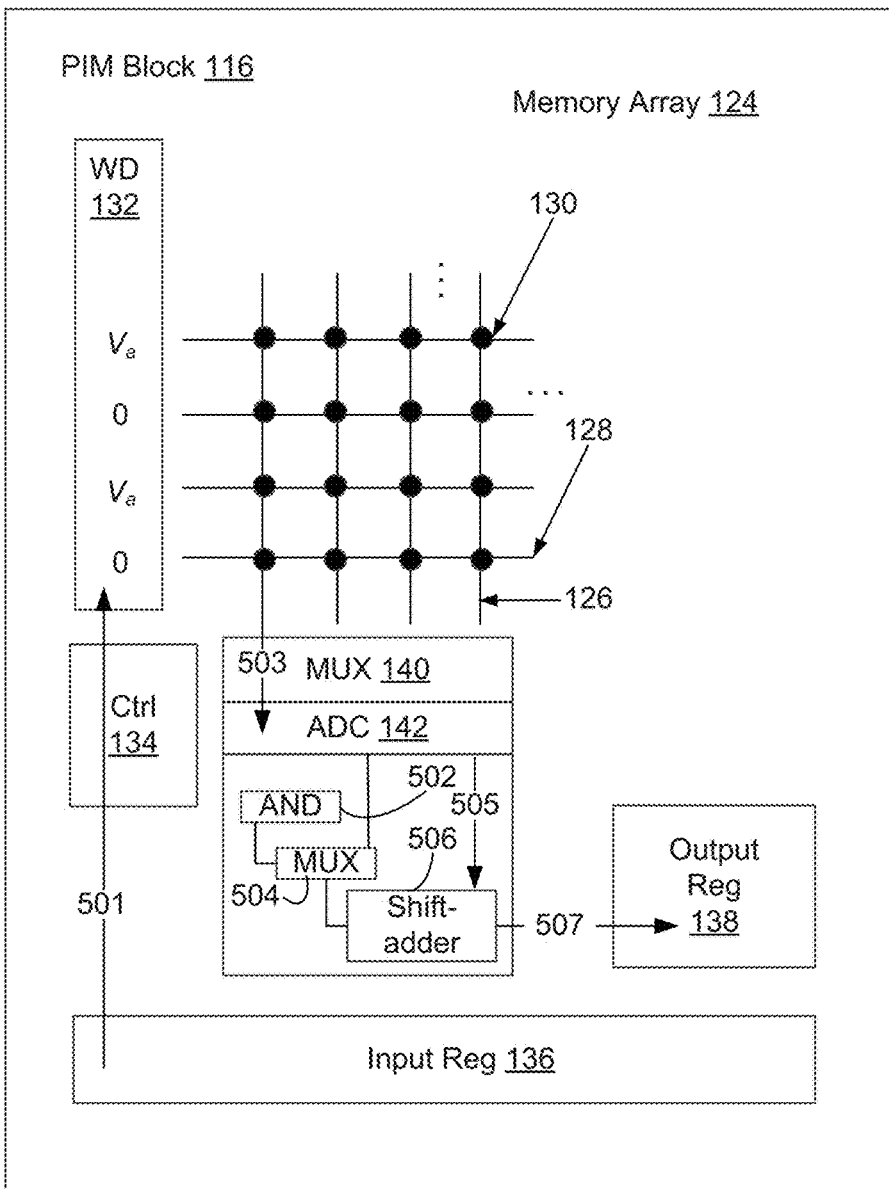
FIG. 5A illustrates a data flow of a hybrid-mode PIM block configured in analog mode in accordance with certain aspects of the present disclosure.

FIG. 5A illustrates a data flow 500 of a hybrid mode PIM block 116 configured in analog mode in accordance with certain aspects of the present disclosure. The data flow 500 may be associated with operations associated with PW convolution. In certain configurations, the controller 134 may configure the PIM block 116 into the analog mode to perform PW convolution. The controller 134 by initiate and/or control one or more of the operations described below in connection with PW convolution.

In analog mode, a bit-vector is sent (at 501) from the input register 136 (e.g., input component) to the WD 132. Using the bit-vector, the WD 132 may generate a binary voltage vector (e.g., $V_a$ for logic value "1"), which is applied on each wordline 128. The bitline current that accumulates on the bitlines 126 may represent a partial sum that is sampled by the ADC 142. Although not shown, when the input bit precision is 1, the ADC 142 may send the partial sum value to the output register 138. Otherwise, the partial sum may be sent (at 503) from the ADC 142 to the shift-adder 506 for partial sum accumulation in the local PE 144. The partial sum accumulation may then be sent (at 505) to the output register 138 (e.g., output component), where the partial sum accumulation may be stored.

Figure 5B:
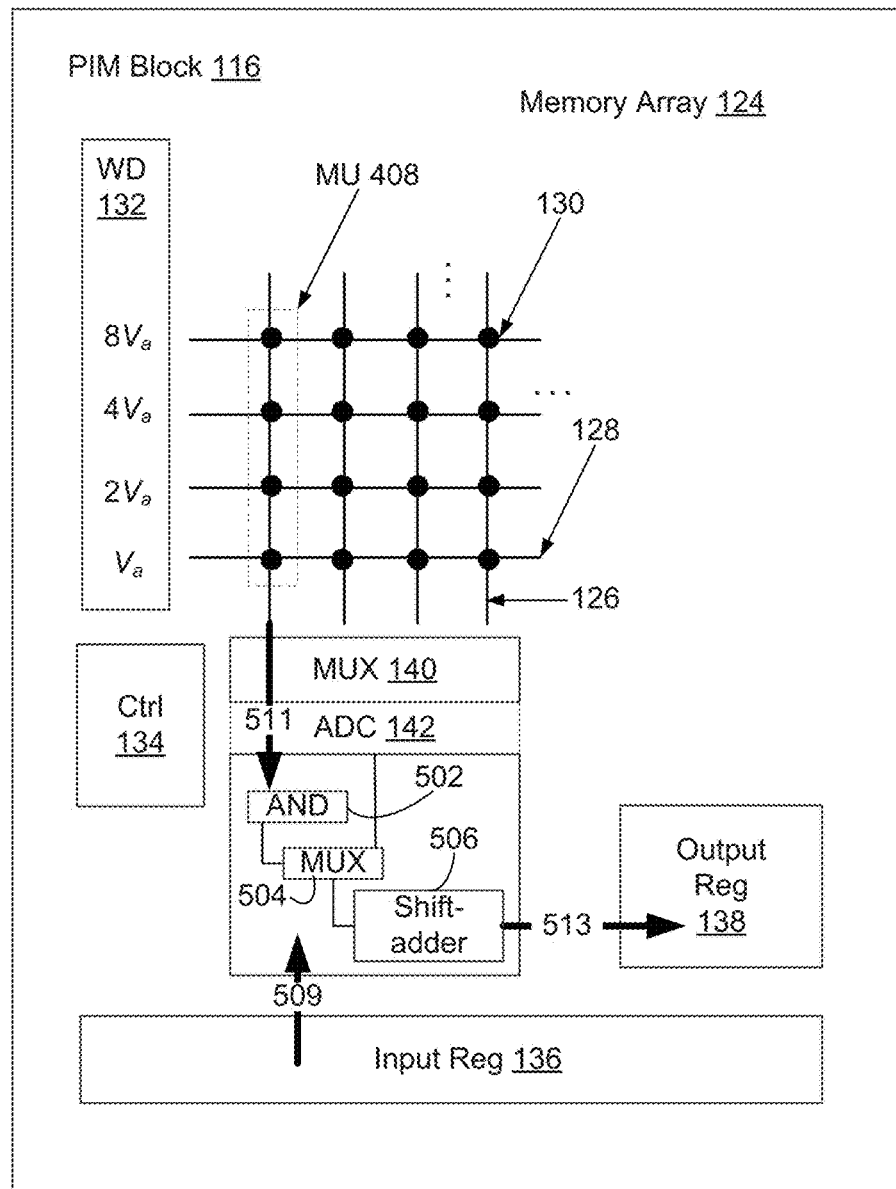
FIG. 5B illustrates a data flow of a hybrid mode PIM block configured in digital mode in accordance with certain aspects of the present disclosure.

FIG. 5B illustrates a data flow 520 of a hybrid mode PIM block 116 configured in digital mode in accordance with certain aspects of the present disclosure. The data flow 520 may be associated with operations associated with DW convolution. In certain configurations, the controller 134 may configure the PIM block 116 into the digital mode to perform DW convolution. The controller 134 may initiate and/or control one or more of the operations described below in connection with DW convolution.

In digital mode, the input data (e.g., input feature maps) may be input (at 509) from the input register 136 (e.g., input component) into the local PE 144. The WD 132 may generate a multi-level voltage vector (e.g., 1.0-8.0$V_a$) to active one MU 408. In the present example, the MU 408 comprises four memory cells 130. As described above in connection with FIG. 4A, the number of memory cells 130 that are grouped into an MU 408 may be related to the resolution ($R_{ADC}$) of the ADC 142. The bitline current that accumulates at the MU 408 may represent a logic value. In the example illustrated in FIG. 5B, the bitline current represents a 4-bit logic value.

The ADC 142 may sample the accumulated bitline current and read out weights that may be sent (at 511) to the local PE 144. The local PE 144 may perform a multiplication operation using the input data input from the input register 136 and the weights received from the ADC 142. The local PE 144 may generate an output feature maps by performing an accumulation operation based at least in part on the results of the multiplication operation.

The local PE 144 of the present disclosure may include a bit-serial multiplier (e.g., 502 and 504) that performs the multiplication operation and a shift-adder 506 configured to perform the accumulation operation using one or more of the results (e.g., outputs) from the bit-serial multiplier. The bit-serial multiplier included in the local PE 144 may include "AND" logic 502 and at least one multiplexer (MUX) circuit 504. The bit-serial multiplier may be added to the shift-adder 506 that is also used in analog mode. By repurposing the shift-adder 506 in the local PE for both digital and analog mode, the extra footprint in the local PE 144 may be reduced. The output features maps accumulated by the shift-adder 506 may be output (at 513) to the output register 138.

Figure 6:
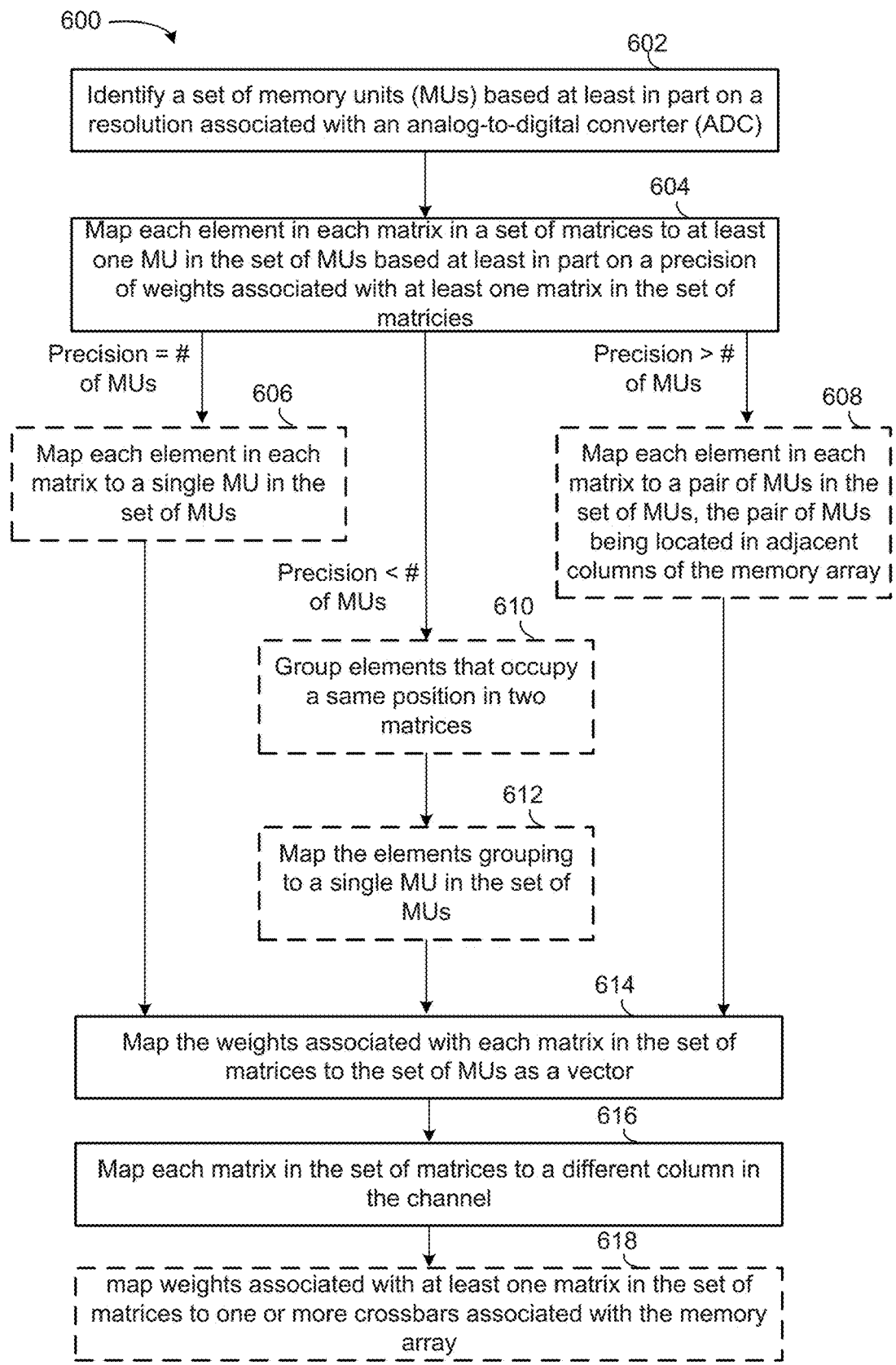
FIG. 6 is a flowchart of an exemplary method for kernel mapping implemented by a PIM block configured in hybrid mode in accordance with certain embodiments of the present disclosure.

FIG. 6 is a flowchart of an exemplary method 600 for DW kernel mapping implemented by a PIM block configured in hybrid mode, according to some embodiments of the present disclosure. For example, the operations described in connection with method 600 may be performed by any one or combination of, e.g., PIM block 116, memory array 124, memory crossbar 125a, memory crossbar 125b, bitline 126, wordline 128, memory cell 130, WD 132, controller 134, input register 136, output register 138, MUX 140, ADC 142, local PE 144, "AND" logic 502, MUX circuit 504, shift-adder 506 described above in connection with various example embodiments. It should be understood that the operations shown in method 600 are not exhaustive and that other operations can be performed as well before, after, or between any of the illustrated operations. Further, some of the operations may be performed simultaneously, or in a different order than shown in FIG. 6. Certain operations in FIG. 6 may be optional, and such optional operations may be indicated with dashed lines.

At 602, the PIM block may identify a set of MUs based at least in part on a resolution associated with an ADC. In certain aspects, the set of MUs may be located in a channel of a memory subarray. In certain other aspects, the channel may include a set of columns of the memory subarray. In certain other aspects, each MU in the set of MUs may be comprised of a set of adjacent memory cells located in a column of the set of columns. For example, referring to FIG. 4A, a set of MUs 408 (e.g., a set of MUs may include one or more MUs) located in a same channel 404 may be identified (at 401) based at least in part on $R_{ADC}$. For example, a set of $R_{ADC}$ adjacent memory cells 130 located in a same column 406 (e.g., bitline 126) may be grouped into a MU 408. Again, the number of memory cells 130 are grouped such that the logic value (e.g., 4-bit) of a single MU 408 may be accurately sampled during a single ADC cycle by an ADC 142.

At 604, the PIM block may map each element in each matrix in a set of matrices to at least one MU in the set of MUs based at least in part on a precision of weights associated with at least one matrix (e.g., one or more kernels) in the set of matrices. In certain aspects, the mapping of the elements to MU(s) may depend on whether the precision of the weights is equal to, greater than, or less than the number of identified MUs, as described below in connection with 606, 608, 610, 612. For example, when the precision of the weights is equal to the number of MUs, then the operation of 604 is performed using the operation of step 606. When the precision of the weights is greater than the number of MUs, then the operation of 604 is performed using the operation of step 608. When the precision of the weights is less than the number of MUs, then the operation of 604 is performed using the operation of steps 610 and 612.

At 606, when the precision of the weights is equal to the number of MUs (e.g., $R_{ADC}$), the PIM block may map each element in each matrix to a single MU in the set of MUs. For example, referring to FIG. 4, the precision of the weights may be equal to $R_{ADC}$. Here, in each of the kernels 402, one element may be mapped (at 403) to a single MU 408.

At 608, when the precision of the weights is greater than the number of MUs (e.g., $R_{ADC}$), the PIM block may map each element in each matrix to a pair of MUs in the set of MUs. In certain aspects, the pair of MUs may be located in adjacent columns of the memory array. For example, referring to FIG. 4A, in each of the kernels, one element may be divided into 4-bit LSB and 4-bit MSB and mapped (at 403') into two MUs 408 located in adjacent columns 406.

When the precision of the weights is greater than the number of MUs (e.g., $R_{ADC}$), the operation moves to 610. At 610, the PIM block may group elements that occupy a same position in two matrices. For example, referring to FIG. 4A, the precision of the weights may be 2-bit, and $R_{ADC}$ is 4-bit. Here, in each of the kernels, two elements in the same locations of two kernels are grouped and then mapped (at 403") one MU 408 in the memory array 124. Once the elements are mapped using one of the three example techniques described above, the DW kernel mapping flow 400 may proceed as follows.

At 612, the PIM block may map the elements grouping to a single MU in the set of MUs. For example, referring to FIG. 4A, the precision of the weights may be 2-bit, and $R_{ADC}$ is 4-bit. Here, in each of the kernels, two elements in the same locations of two kernels are grouped and then mapped (at 403") one MU 408 in the memory array 124. Once the elements are mapped using one of the three example techniques described above, the DW kernel mapping flow 400 may proceed as follows.

At 614, the PIM block may map the weights associated with each matrix in the set of matrices to the set of MUs as a vector. For example, referring to FIG. 4A, the weights in each kernel 402 may be mapped (at 405) to K×K MUs 408 located in the same column 406 of the memory array 124, e.g., as a vector.

At 616, the PIM block may map each matrix in the set of matrices to a different column in the channel. For example, referring to FIG. 4A, each of the kernels 402 may be mapped (at 407) into a single column 406 of the memory array 124. Thus, in the example illustrated in FIG. 4A, Ch columns are used.

At 618, the PIM block may map weights associated with at least one matrix in the set of matrices to one or more crossbars associated with the memory array. For example, referring to FIGS. 1 and 4A, the DW convolution layer uses K×K×Ch MUs 408 to map all its weights, which may be mapped into multiple memory crossbars 125a, 125b of memory array 124.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A processing-in-memory (PIM) device, comprising:
    an input component configured to store at least in part input data;

a memory array comprising a plurality of memory units (MUs);
a peripheral logic configured to operate in an analog mode or in a digital mode; and
a control circuit configured to:
in the digital mode, enable the peripheral logic to perform a multiplication operation or accumulation operation; and
in the analog mode, enable the peripheral logic to perform a shift-add operation and generate a partial sum.

2. The PIM device of claim 1, further comprising a word line driver, wherein, when in the digital mode, the control circuit is further configured to:
enable the word line driver to generate a multi-level voltage vector to activate at least one MU in the memory array,
wherein a bitline current accumulates at the at least one MU upon activation, and
wherein the bitline current is associated with a logic value.

3. The PIM device of claim 2, wherein the at least one MU comprises a set of adjacent cells in a column of the memory array.

4. The PIM device of claim 2, further comprising an analog-to-digital converter (ADC), wherein, when in the digital mode, the control circuit is further configured to:
enable the ADC to output a set of weights associated with the logic value to the peripheral logic.

5. The PIM device of claim 4, wherein, when in the digital mode, the control circuit is further configured to enable the peripheral logic to:
obtain the input data from the input component;
perform the multiplication operation based at least in part on the set of weights and the input data; and
perform the accumulation operation based at least in part on one or more results of the multiplication operation to generate a features map.

6. The PIM device of claim 1, wherein the digital mode supports operations associated with a depth-wise convolution.

7. The PIM device of claim 1, wherein the analog mode supports operations associated with a point-wise convolution.

8. The PIM device of claim 1, wherein the peripheral logic comprises a bit-serial multiplier configured to perform the multiplication operation.

9. The PIM device of claim 8, wherein the bit-serial multiplier comprises AND logic and a MUX circuit.

10. The PIM device of claim 8, wherein the peripheral logic further comprises a shift-adder configured to perform the accumulation operation.

11. The PIM device of claim 1, wherein, when in the analog mode, the memory array is configured to perform a vector-dot-product operation.

12. A method for matrix multiplication implemented by at least one processing-in-memory (PIM) block configured in a digital mode, the method comprising:
identifying, by a controller, a set of memory units (MUs) based at least in part on a resolution associated with an analog-to-digital converter (ADC), the set of MUs being located in a channel of a memory array, the channel including a set of columns of the memory array, and each memory unit (MU) in the set of MUs being comprised of a set of adjacent memory cells located in a column of the set of columns;
mapping, by the controller, each element in each matrix in a set of matrices to at least one MU in the set of MUs based at least in part on a precision of weights associated with at least one matrix in the set of matrices;
mapping, by the controller, the weights associated with each matrix in the set of matrices to the set of MUs as a vector; and
mapping, by the controller, each matrix in the set of matrices to a different column in the channel.

13. The method of claim 12, wherein when the precision of the weights is equal to a number of MUs in the set of MUs, the mapping each element in each matrix in a set of matrices further comprises:
mapping each element in each matrix to a single MU in the set of MUs.

14. The method of claim 12, wherein when the precision of the weights is greater than a number of MUs in the set of MUs, the mapping each element in each matrix in a set of matrices further comprises:
mapping each element in each matrix to a pair of MUs in the set of MUs, the pair of MUs being located in adjacent columns of the memory array.

15. The method of claim 12, wherein when the precision of the weights is less than a number of MUs in the set of MUs, the mapping each element in each matrix in a set of matrices further comprises:
grouping elements that occupy a same position in two matrices; and
mapping the elements grouping to a single MU in the set of MUs.

16. A processing-in-memory (PIM) device, comprising:
a memory array comprising a plurality of memory units (MUs); and
at least one controller coupled to the memory array and configured to:
identify a set of MUs in the memory array based at least in part on a resolution associated with an analog-to-digital converter (ADC), the set of MUs being located in a channel of a memory array, the channel including a set of columns of the memory array, and each MU in the set of MUs being comprised of a set of adjacent memory cells located in a column of the set of columns;
map each element in each matrix in a set of matrices to at least one MU in the set of MUs based at least in part on a precision of weights associated with at least one matrix in the set of matrices;
map the weights associated with each matrix in the set of matrices to the set of MUs as a vector; and
map each matrix in the set of matrices to a different column in the channel.

17. The PIM device of claim 16, wherein when the precision of the weights is equal to a number of MUs in the set of MUs, the at least one controller is configured to map each element in each matrix in a set of matrices by:
mapping each element in each matrix to a single MU in the set of MUs.

18. The PIM device of claim 16, wherein when the precision of the weights is greater than a number of MUs in the set of MUs, the at least one controller is configured to map each element in each matrix in a set of matrices by:
mapping each element in each matrix to a pair of MUs in the set of MUs, the pair of MUs being located in adjacent columns of the memory array.

19. The PIM device of claim 16, wherein when the precision of the weights is less than a number of MUs in the set of MUs, the at least one controller is configured to map each element in each matrix in a set of matrices by:
 grouping elements that occupy a same position in two matrices; and
 mapping the elements grouping to a single MU in the set of MUs.

20. The PIM device of claim 16, wherein the at least one controller is further configured to:
 map weights associated with at least one matrix in the set of matrices to one or more crossbars associated with the memory array.

* * * * *